United States Patent [19]

Rothstein et al.

[11] Patent Number: 4,664,160

[45] Date of Patent: May 12, 1987

[54] FIBER FILLING SYSTEM

[75] Inventors: Leonard Rothstein, Paramus, N.J.; Bernard Brown, Kings Point, N.Y.

[73] Assignee: Ormont Corporation, Lyndhurst, N.J.

[21] Appl. No.: 862,991

[22] Filed: May 14, 1986

Related U.S. Application Data

[62] Division of Ser. No. 673,151, Nov. 19, 1984, abandoned.

[51] Int. Cl.[4] .......... G01G 13/00; D01G 7/00

[52] U.S. Cl. .......... 141/67; 141/98; 366/156; 53/524; 406/173; 19/305; 19/80 R

[58] Field of Search .......... 141/1, 10, 11, 67–70, 141/98, 114, 37; 366/156; 19/80 R, 305, 97, 85; 406/173, 96, 98, 99; 53/521, 113, 524

[56] References Cited

U.S. PATENT DOCUMENTS

| | | | |
|---|---|---|---|
| 153,409 | 7/1874 | Wendel | 19/80 R |
| 763,798 | 6/1904 | Sample | 19/80 R |
| 1,027,570 | 5/1912 | Sheldon | 141/67 X |
| 2,060,629 | 11/1936 | McJoynt | 141/67 X |
| 2,252,581 | 8/1941 | Saint-Jacques | 406/173 X |
| 2,794,454 | 6/1957 | Moulthrop | 141/67 |
| 3,686,714 | 8/1972 | Wirth | 19/80 R |
| 3,693,836 | 9/1972 | Eisner | 141/67 X |
| 3,839,765 | 10/1974 | Thomas | 19/80 R |
| 3,939,532 | 2/1976 | Weigand | 19/305 X |
| 4,127,220 | 11/1978 | Werthaiser | 141/83 X |
| 4,197,016 | 4/1980 | Winterholter et al. | 366/165 |
| 4,258,455 | 3/1981 | Werner | 19/305 |
| 4,268,340 | 5/1981 | Fitzgerald et al. | 19/305 |
| 4,337,032 | 6/1982 | Duplovy et al. | 366/165 |

FOREIGN PATENT DOCUMENTS

| | | | |
|---|---|---|---|
| 2504159 | 10/1982 | France | 19/85 |
| 0878800 | 11/1981 | U.S.S.R. | 19/85 |

*Primary Examiner*—Stephen Marcus
*Assistant Examiner*—Ernest G. Cusick
*Attorney, Agent, or Firm*—Robert S. Salzman

[57] ABSTRACT

A fiber filling system features a picking device for separating clumped fiber, that feeds to an air and fiber circulation chamber. The circulation chamber aerates and fluffs the separated fiber into a fibrous billow, which is then discharged to a stuffing chute. A stuffable article, such as a toy, pillow, or furniture cushion casing is attached to the chute and is filled with the fibrous billow in a metered amount.

8 Claims, 6 Drawing Figures

FIBER FILLING SYSTEM

This application is a divisional application of the parent, Ser. No. 673,151; filed: Nov. 19, 1984, now abandoned.

FIELD OF THE INVENTION

The invention relates to a fiber filling system for feeding and stuffing a quantity of fiber material into a hollow, stuffable article such as a toy, pillow, furniture or cushion casing, and more particularly to a fiber filling system wherein the fiber is sufficiently aerated and fluffed to provide a substantially uniform fibrous billow for filling toys, pillows or cushions.

BACKGROUND OF THE INVENTION

In the field of toy, pillow and cushion stuffing, many have preferred to employ solid foam or resinated cut polyester materials. The reason for this preference is that the solid foam materials are uniform, and will provide a toy, pillow and cushion free from lumps and irregularities. The foam or resinated cut polyster systems have several drawbacks, however, which limit their use. In the first instance, solid foam materials must be prefoamed and cut to a given size and shape. If more than one cushion or pillow size and shape is in production, the problems of controlling ordering, shipping and inventory become complex and costly. Such systems require large warehouse and inventory space for storing these materials. In addition, not every buyer prefers foam-filled articles, because they are stiffer and generally less supple than most fiber-filled items.

In recent times, the furniture and bedding industry has utilized a blown fiber system wherein synthetic fibers are injected into pillows and cushions by means of a forced duct-fed air stream. Such a system has many advantages, such as reduced manufacturing and inventory costs. Pillows and cushions filled by this process tend to have a softer, more appealing feel, and are generally more comfortable. Manufacturing production rates are high and storage space for the material is low.

A fiber blown system that is presently commercially available, generally comprises a hopper wherein dense fiber mats or bales are picked apart and then garnetted. The separated fibers are then introduced into a delivery duct that terminates in a filling nozzle for stuffing the fibers into pillows, toys, and furniture cushion casings. This system has high power and maintenance requirements. Many times there is a lack of uniform stuffing densities between different runs and different batches. The custom-made machinery is costly and takes a large amount of factory space.

Recently, a fiber blowing technique using an aerostream has become a viable manufacturing procedure for stuffing pillows and cushions. In this system, however, only a limited range of materials can be used. Materials having a fiber length greater than approximately one and one-half inches do not work well, and generally cannot be stuffed efficiently.

The present invention uses a new technique, wherein the fiber material is aerated and fluffed before entering the delivery air-stream. The inventive system will generally utilize less material for each run, because the fiber is aerated and fluffed into a uniform billow.

The inventive fiber filling system comprises a fiber and air circulation chamber, wherein the fiber materials are aerated and fluffed in a cyclonic flow path. This cyclonic flow provides sufficient fluffing and aerating of the fiber materials, such that fibers in a wide range of densities, deniers and fiber lengths can be processed. As such, the aero-stream fiber filling system of this invention has a universality that the prior custom-made machines cannot provide.

The invention is also more structurally compact and less costly than the prior systems. In addition, many parts have been eliminated, such as the metallic worker stripper, doffer, and main cylinder rolls, etc. Various sleeve bearings and shafts requiring constant lubrication have also been eliminated. Also, because the cyclonic flow is very uniform and rapid, a high production rate is achieved as well as a uniform billow density.

SUMMARY OF THE INVENTION

The invention features a fiber filling system for feeding and stuffing a quantity of fiber material into a hollow, stuffable article, such as a toy, pillow, furniture or cushion casing. The system has a hopper into which clumps of fiber are inserted. Below the hopper is a combing and separating drum, wherein the clumps of fiber are separated into individual strands. A squirrel-cage fan disposed below the combing and separating drum blows the loose fiber into a circulation chamber where a cyclonic flow of air and fiber is created to aerate and fluff the fiber into a uniform fibrous billow. The inlet to the chamber is tangentially angled to the cyclonic flow path created inside the chamber in order to provide a smooth introduction of the fiber materials.

At least one air stream generator or air turbine feeds into the chamber to establish the cyclonic flow path. Preferably two spaced-apart air stream generators are used to create a very rapid circulation. Guide means, such as baffle surfaces within the chamber, provide a given air and fiber flow path. The air stream from the generators is caused to impinge upon and deflect from these internal surfaces. A stagnation zone is established by the guide means about an outlet of the chamber where aerated and fluffed fiber is caused to accumulate for subsequent discharge to at least one filling duct. The filling duct has a rotating air impeller at one end, which creates an air stream to move the fiber materials to a stuffing nozzle located at an opposite end of the duct. A pillow or cushion casing is fitted to the nozzle, filled with the fiber material, and removed. A metering mechanism within the duct allows for a given amount of fiber material to be directed and fed into the pillow and cushion. The metering mechanism can be manually or automatically controlled.

It is an object of the invention to provide an improved fiber filling system;

It is another object of this invention to provide a fiber filling system that aerates and fluffs the fiber materials to provide a substantially uniform billow of fiber material;

It is a further object of the invention to provide a fiber filling system that can process a wide range of fiber materials.

These and other objects of this invention will be better understood and will become more apparent with reference to the subsequent detailed description considered in conjunction with the accompanying drawings.

DETAILED DESCRIPTION OF THE INVENTION

Generally speaking, the invention features a fiber filling system for stuffing toys, pillows, cushions, and other hollow articles. The system aerates and fluffs the fiber material to provide a uniform billow of fiber. An air and fiber circulation chamber aerates and fluffs the fiber by rapidly moving the fiber in a given cyclonic flow path. A stagnation zone in the chamber allows the billowed fiber to accumulate for subsequent discharge to a stuffing duct.

Figure 1:
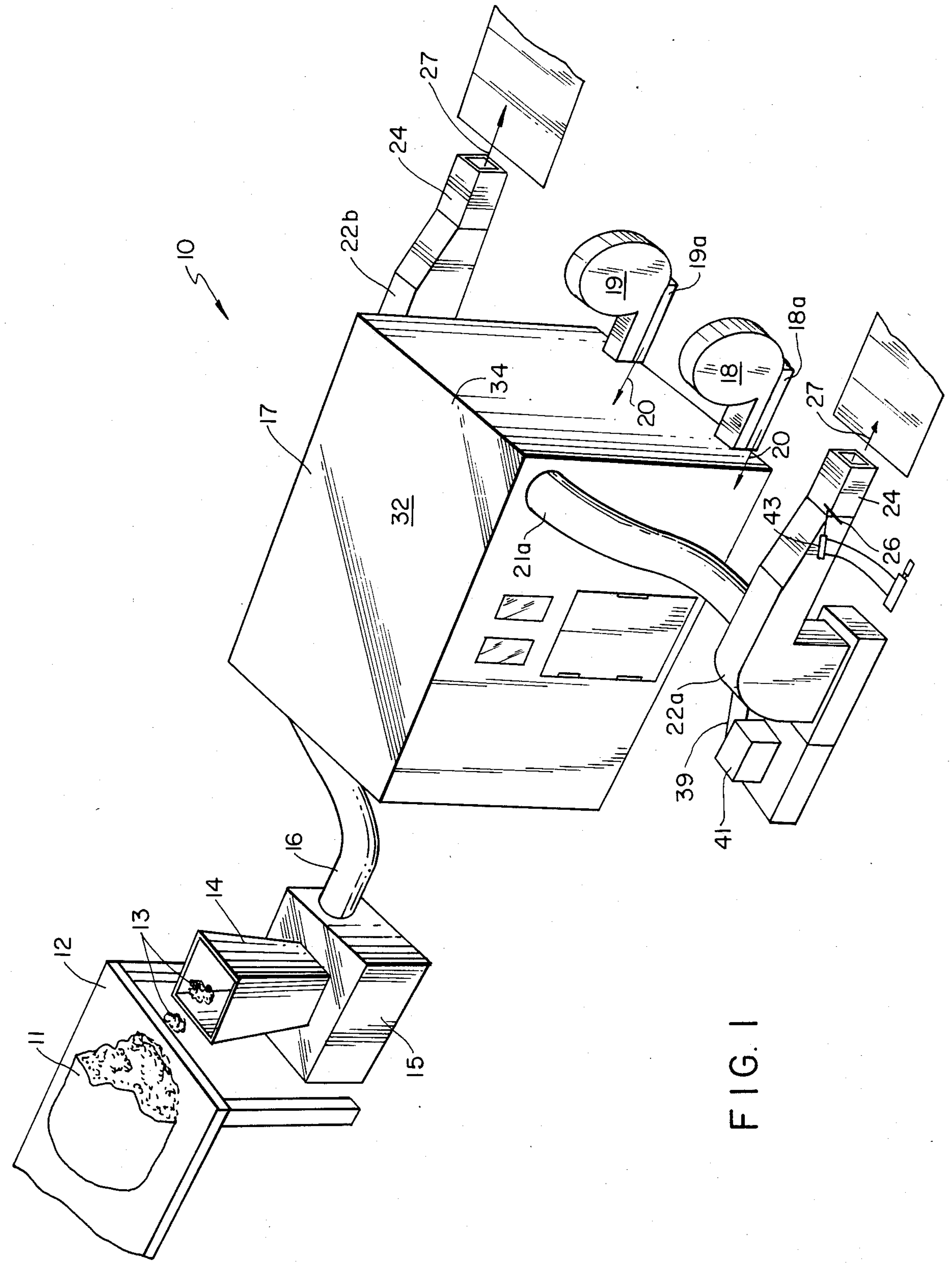
FIG. 1 is a schematic perspective view of the fiber filling system of this invention.

Now referring to FIG. 1, the fiber filling system 10 of this invention is shown in a perspective schematic view. A bale 11 of unprocessed synthetic fiber is shown resting upon a work table 12. The fiber material can be one of several different kinds of material either natural or synthetic, or a mixture of natural and synthetic fibers, such as cotton and polyester. Different fiber lengths and deniers can be utilized. A preferred fiber is polyester of 6 to 15 denier and fiber length of 2 to 3 inches. The polyester may be purchased from Hoechst Company, headquartered in New Jersey, under the tradename of TREVIRA.

The bale 11 is broken into smaller clumps 13 and fed into a hopper 14. The hopper 14 directs the clumps 13 to a picking device 15 disposed below the hopper. The picking device 15 which separates the clumped fiber, will be described in more detail with reference to FIG. 5, hereinafter.

For purposes of brevity, like elements will be given the same designations throughout the description.

From the picking device 15, the separated fiber is directed to a circulation chamber 17 via duct 16. The circulation chamber 17 is fed by two air stream generators 18 and 19, respectively. The air stream generators 18 and 19 can be, respectively, high speed air fans or air turbines that create a powerful stream of air that is forced (arrows 20) into the chamber 17 via ducts 18a and 19a, respectively.

Internal baffling, which will be shown and described hereinafter with reference to FIG. 2, creates a given cyclonic flow path within the chamber 17. This air flow circulates the fiber entering the chamber at the opposite end via duct 16. The fiber material is aerated and fluffed by means of the rapid circulation within the chamber 17.

The aerated and fluffed fiber is gathered within the chamber 17, and when an article is to be stuffed, it is drawn from the chamber 17 through at least one of two discharge ducts 21a and 21b (shown in FIG. 2), respectively disposed on each side of the chamber 17. The fluffed fiber next enters respective stuffing chutes 22a and 22b which are fed by discharge ducts 21a and 21b, respectively. The fluffed and aerated fiber material is moved through the respective stuffing chutes 22a and 22b by means of a motor-powered, rotating impeller, 23 (see FIG. 3) disposed opposite the exit aperture 25 of the respective discharge ducts 21a and 21b.

The flow of fluffed fiber material through the stuffing chutes 22a and 22b terminates in a necked chute section 24 in which a metering baffle 26 is located. The metering baffle 26 controls the amount of material leaving (arrows 27) the chute section 24.

Figure 4:
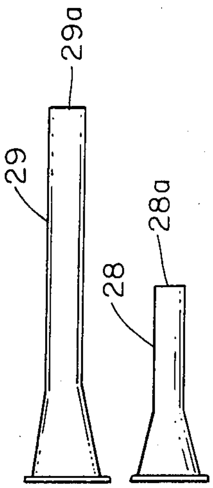
FIG. 4 is a side view of a plurality of nozzles of different sizes that can be attached to the discharge duct depicted in FIG. 3.

A stuffing nozzle 28 or 29 shown in FIG. 4 is attached to section 24 of the stuffing chutes. The size of the nozzle 28 or 29 used will depend upon the size of the stuffable article envelope which fits over the open mouth 28a or 29a, respectively, of the nozzle. The fiber materials are forced through the appropriate nozzle 28 or 29 into the stuffable article; the stuffed article is removed from the nozzle; and a new hollow article envelope is then inserted over the nozzle mouth 28a or 29a, respectively.

Figure 2:
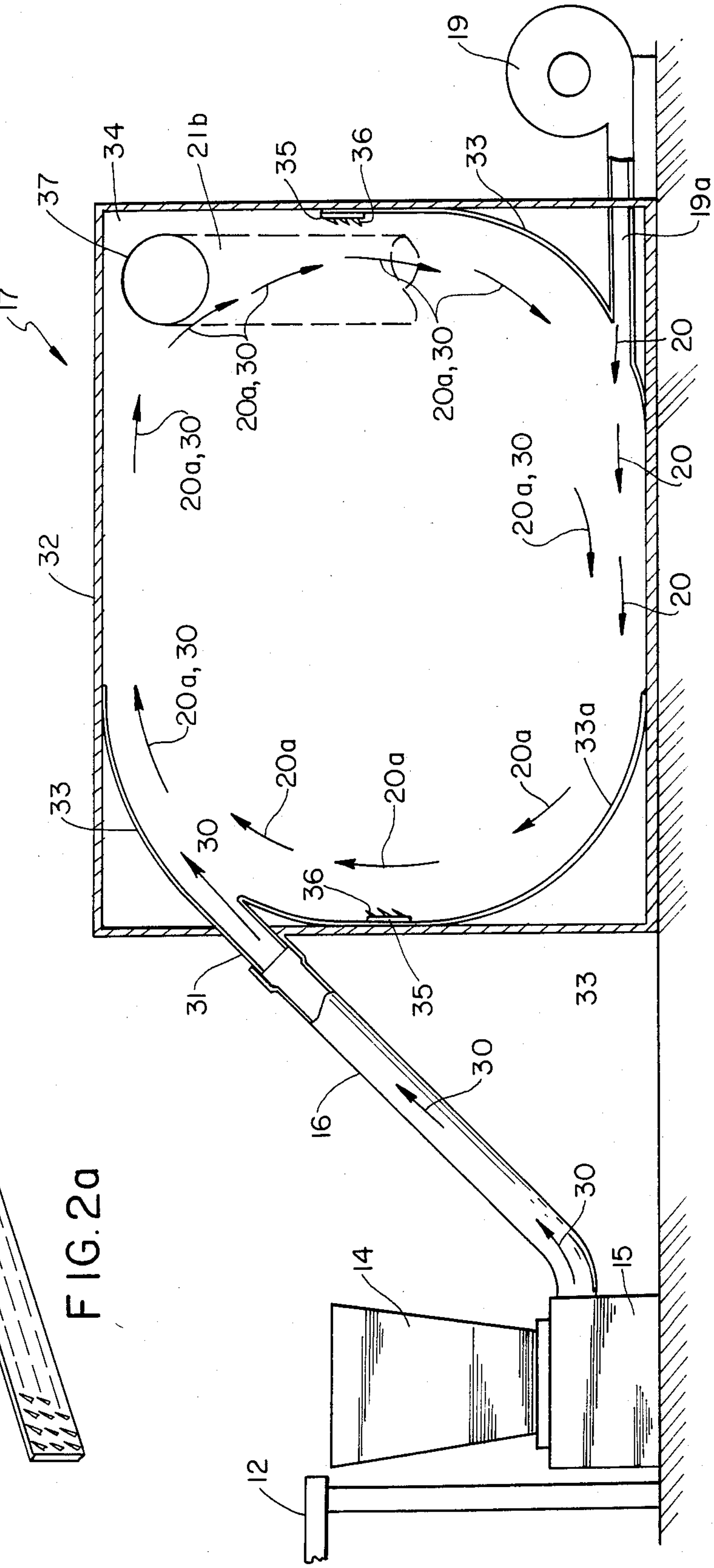
FIG. 2 is a partial side view of the fiber filling system illustrated in FIG. 1, showing the circulation chamber in a sectional view.

Referring to FIG. 2, a sectional view of the inside of chamber 17 is illustrated. As aforementioned, the clumped fiber leaving table 12 is directed into a hopper 14 which feeds the clumps to a picking device 15 which separates the fibers and discharges the fibers into duct 16. The fibers flow through (arrows 30) duct 16 to the mouth of inlet 31 of chamber 17.

The chamber 17 comprises an outer housing 32 having a box shape. All around the chamber housing are disposed internal baffle or guide plates 33, except for the upper right-hand corners of the box. Air which is fed into the inside of the chamber 17 by air stream generators 18 and 19, respectively, is directed (arrows 20) against surface 33a of a lower baffle plate 33 positioned approximately below inlet 31. The curved surface 33a forces the air upward (arrows 20a) where the air impinges and mixes with the fiber flow 30. The upper baffle 33 which is an extension of inlet 31 directs the air and fiber mixture 20a; 30 across the chamber 17. The weight and circulation of the air and fiber mixture 20a; 30 cause the mixture to sink as it reaches the far corner 34, wherein the circulating aerated fiber mixture 20a; 30 mixes with a fresh blast of incoming air 20, and the cycle is repeated.

In this way a given cyclonic flow path is created by internal baffles 33.

It will be noted that the inlet 31 is angled tangentially to the air flow 20a, such that the influx 30 of material mixes readily with the flow 20a.

As the air and fiber mixture 20a; 30 rapidly circulate within the chamber 17, the fiber becomes aerated and fluffed causing the fiber to billow and accumulate in corner 34, which is a stagnation zone by virtue of the lack of baffling plates 33.

Figure 2A:
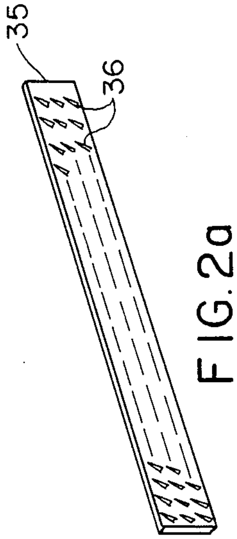
FIG. 2a is a perspective view of comb-like projections disposed within the chamber depicted in FIG. 2.

As the air and fiber mixture 20a; 30 circulate around the chamber 17, they also sweep past two banks 35 of comb-like projections 36, shown in greater detail in FIG. 2a. The projections 36 are like teeth of a comb that remove any remaining small clumps and snags in the fiber materials. As will be noted from the figures, the projections are angled at approximately 45 degrees with the flow.

Naturally, any small pieces of metal or other impurities will sink to the bottom of chamber 17, where they can be periodically removed.

The aerated and fluffed billow of fiber in corner 34 is caused to be discharged through outlets 37 on either side of chamber 17 into discharge ducts 21a and 21b, respectively, when demand is made for stuffing materials in the stuffing chutes 22*a* and 22*b*, respectively. The demand for stuffing material is actuated by opening of the metering baffles 26 in the stuffing chutes, as shown in FIG. 3.

Figure 3:
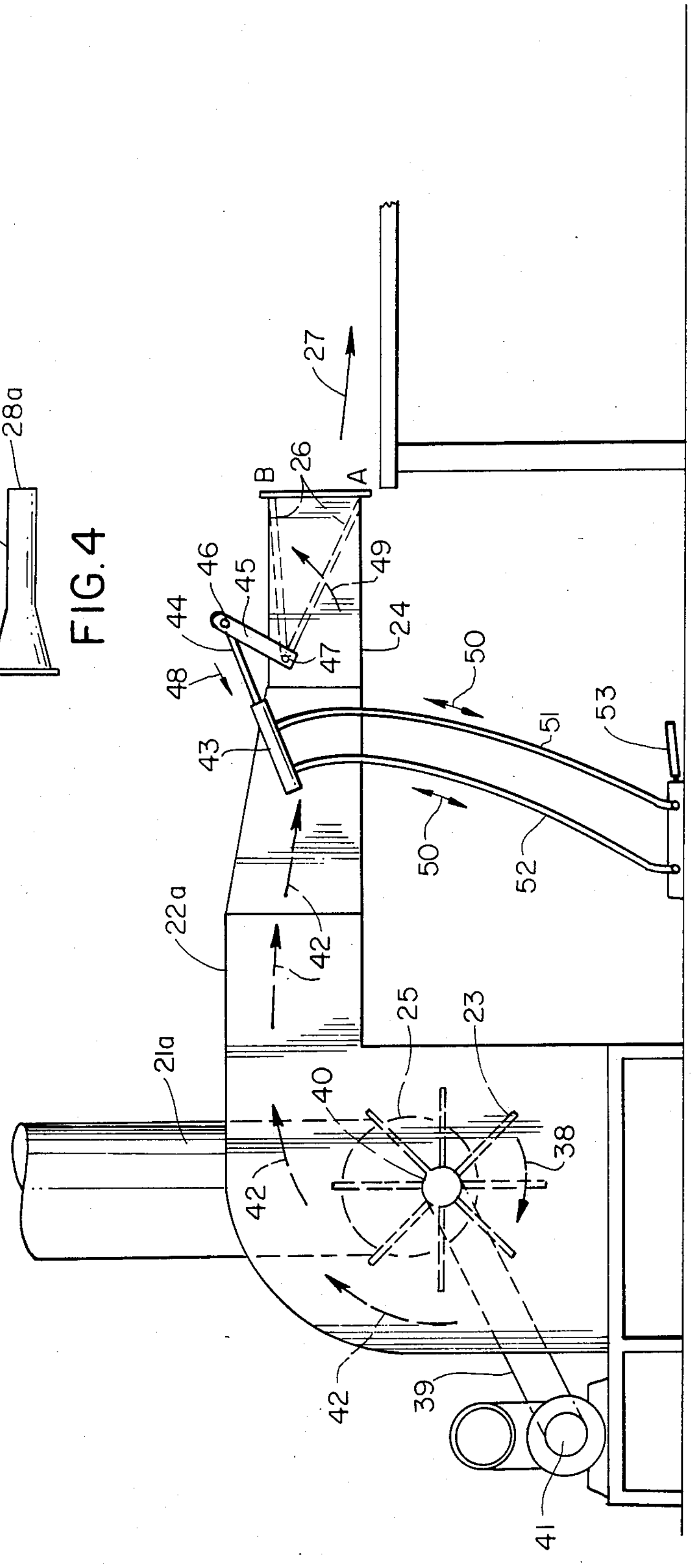
FIG. 3 is a schematic side view of one of the discharge ducts with the internal air impeller and metering baffle shown in phantom.

The stuffing chute 22*a*, shown in FIG. 3, receives billowed fiber from duct 21*a* through opening 25, as aforementioned. The impeller 23, in turn forces billowed fiber received from duct opening 25, towards the metering baffle 26, as depicted by arrows 42.

The metering baffle 26 shown in FIG. 3, is illustrated in the normally closed position at "A", and in the actuated open position at "B". In the closed position A, any material in chute 22*a* will gather behind the baffle 26 in the necked chute section 24.

When the baffle 26 is moved to its open position B, materials in the chute 22*a* will be caused to be discharged from the chute (arrow 27).

The opening and closing of the baffle 26 is controlled by a pneumatically actuated cylinder 43, whose piston rod 44 is connected to link 45 via a rotative pin 46. The link 45 is fixedly attached to the baffle 26. The link 45 and baffle 26 both rotate about pin 47. When the piston rod 33 is retracted (arrow 48), the link 45 and baffle 26 are caused to rotate in a counterclockwise direction (arrow 49) about pin 47, causing baffle 26 to move to the open position B.

The pneumatic cylinder 43 is fed air (arrows 50) through pneumatic tubes 51 and 52, respectively, causing the piston rod 44 to advance or retract. A foot pedal 53 controls a valve (not shown), that forces air (arrows 50) through either of pneumatic tubes 51 and 52. The pedal 53 can be held down for a given time duration to open the baffle 26 (position A) for a given discharge. In this way a metered amount of material is discharged.

The pneumatic cylinder 43 can also be automatically time controlled according to a pneumatic program control unit, such as a WP 6301 microprocessor manufactured by Western Pacific Timer Division, of Minarik Electric Company.

Figure 5:
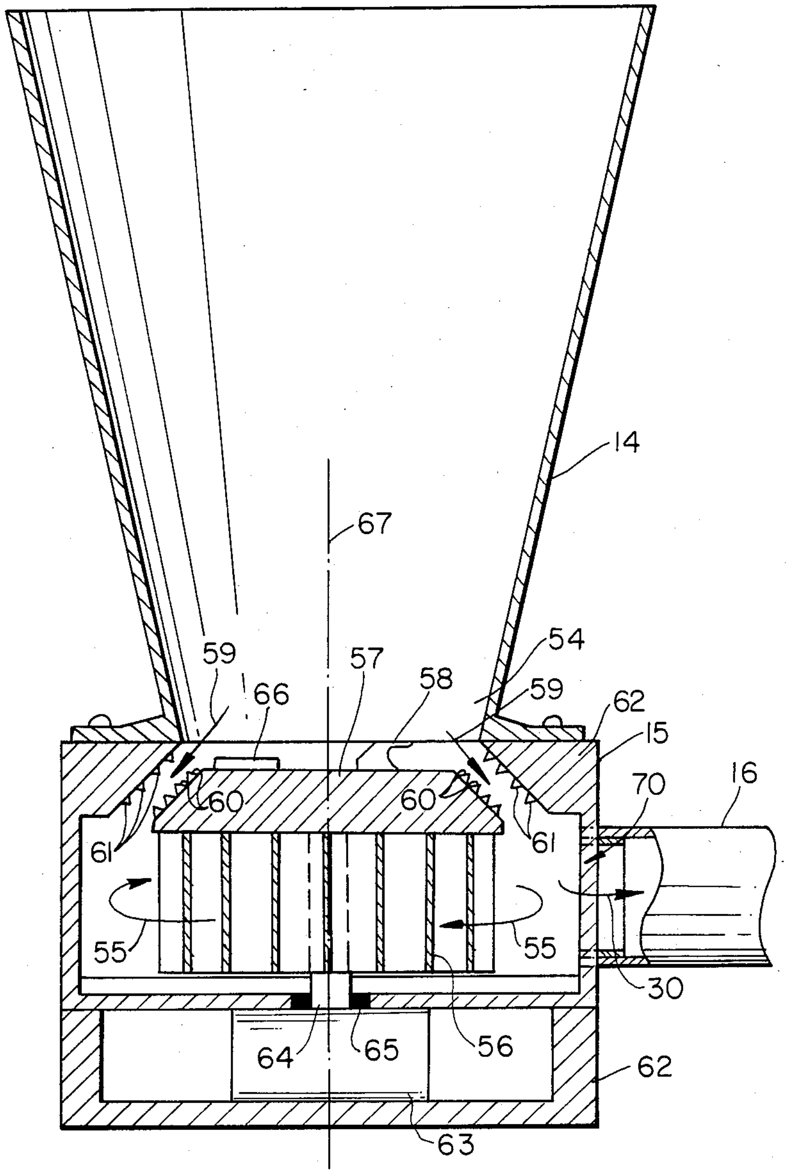
FIG. 5 is a sectional view of the hopper and combing and separating mechanism illustrated in FIG. 1.

Referring to FIG. 5, a sectional view of the hopper 14 and the attached picking device 15 is illustrated to show the details of these apparatuses.

Clumped fiber is deposited in hopper 14, and falls to the bottom necked portion 54.

A rotating (arrows 55) squirrel cage fan 56 has a trapezoidal drum 57 mounted on top, which catches the clumped fiber by means of hook 58.

The rotating hook 58 forces the clumped fiber at the hopper bottom 54 to travel (arrows 59) between rotating teeth 60 attached to drum 57, and the stationary teeth 61 mounted to frame 62 of device 15. The clumped fiber forced between the respective moving and stationary teeth 60 and 61, is caused to be separated into individual fibers. The rotating (arrow 55) squirrel cage fan 56 blows the separated fibers through opening 70 (arrow 30) into and through duct 16, which serves inlet 31 (FIG. 2) of chamber 17.

The fan 56 and drum 57 which is attached thereto, is rotated by means of motor 63 via drive shaft 64 which is rotatively journalled in bearing 65 attached to the housing frame 62.

The counterbalancing weight 66 mounted to the top of rotating drum 57 acts to balance the weight of hook 58, so that the drum 57 will rotate uniformly about its center axis 67.

Having thus described this invention, what is desired to be protected by Letters Patent is presented in the following appended claims.

What is claimed is:

1. A fiber filling system for feeding and stuffing a quantity of fiber material into a hollow, stuffable article such as a toy, pillow, furniture or cushion casing, said fiber filling system comprising:

means for combing and separating fiber materials, said means for combing and separating including a hopper for receiving clumped fiber, said hopper having a necked portion for passing said clumped fiber to a pair of intermeshing comb elements having a plurality of teeth that have relative meshing motion with respect to each other for picking apart and combing said clumped fiber into individual fibers, driving means connected to at least one of said comb elements for causing said relative meshing motion between said teeth of said comb elements, means defining an outlet disposed adjacent said meshing comb elements for passing said individual fibers to a fiber circulation chamber;

a fiber circulation chamber connected to the outlet of said combing and separating means, said circulation chamber having an air circulation path for aerating and fluffing the combed and separated fiber materials, said fiber circulation chamber having a stagnation zone adjacent said air circulation path in which fluffed fibers are accumulated without circulating; and a stuffing means having at least one elongated chute connected to said circulation chamber adjacent said stagnation zone for receiving the aerated and fluffed fiber materials from said fiber circulation chamber, said stuffing means further comprising a manual control for feeding a metered amount of said aerated and fluffed fiber materials from said stagnation zone of said fiber circulation chamber through said chute to a stuffable article.

2. The fiber filling system of claim 1, wherein said chamber comprises means for establishing a cyclonic flow of air and fiber materials therein including guide means for providing a given air and fiber flow path.

3. The fiber filling system of claim 2, wherein said guide means includes at least one deflecting surface for directing impinging air and fiber materials in a cyclonic flow path.

4. The fiber filling system of claim 3, wherein said guide means includes means defining said stagnation zone for gathering aerated and fluffed fiber materials for discharge to said stuffing means.

5. The fiber filling system of claim 1, wherein said stuffing means includes means for establishing a flow of said aerated and fluffed fiber materials through said chute, a discharging nozzle disposed at a distal end of said chute for discharging a given quantity of fiber materials from said nozzle.

6. The fiber filling system of claim 1, further comprising a fan for creating fiber flow from said combing and separating means to said fiber circulation chamber, said fan connected to said driving means, wherein said driving means has the dual purpose of operating said comb elements and said fan.

7. The fiber filling system of claim 6, wherein at least one of said comb elements comprises a rotatable drum, said drum including a hook for catching said clumped fiber from said hopper and directing said clumped fiber between said intermeshing teeth of said comb elements.

8. The fiber filling system of claim 7, wherein said rotatable drum further comprises a counterbalancing weight for balancing the weight of the hook in rotation.

* * * * *